United States Patent [19]

Hamada et al.

[11] Patent Number: 5,201,820
[45] Date of Patent: Apr. 13, 1993

[54] POWER TRANSMISSION SYSTEM FOR A FOUR-WHEEL DRIVE VEHICLE

[75] Inventors: Tetsuro Hamada; Kazunori Shibuya; Kentaro Arai, all of Saitama, Japan

[73] Assignee: Honda Giken Kogyo Kabushiki Kaisha, Tokyo, Japan

[21] Appl. No.: 614,788

[22] Filed: Nov. 14, 1990

[30] Foreign Application Priority Data

Nov. 4, 1989 [JP] Japan .................................. 1-295727
Sep. 7, 1990 [JP] Japan .................................. 2-238244

[51] Int. Cl.$^5$ ..................... B60K 17/34; F16D 25/063
[52] U.S. Cl. ...................................... 180/233; 60/437; 180/247
[58] Field of Search ............... 180/233, 247, 242, 249, 180/305; 60/535, 435, 437; 475/82

[56] References Cited

U.S. PATENT DOCUMENTS 3,884,095  5/1975  Miyao et al. ........................ 475/82
4,286,477  9/1981  Meyerle et al. ..................... 475/82

FOREIGN PATENT DOCUMENTS 60-252026 12/1985 Japan .
106138  5/1988 Japan ................................... 180/247
134349  6/1988 Japan ................................... 180/233

Primary Examiner—Mitchell J. Hill
Attorney, Agent, or Firm—Lyon & Lyon

[57] ABSTRACT

To ensure the benefits of four-wheel drive when the vehicle is accelerating or when the front wheels are slipping, and to eliminate the disadvantage of undesirably transmitting the braking force to the rear wheels when the vehicle is decelerating or when a braking action is applied to the vehicle, the front wheels and the rear wheels are coupled with each other when the rotational speed of the front wheels is higher than that of the rear wheels, but this coupling is disconnected when the rotational speeds of the front and rear wheels are substantially identical or when the rotational speed of the rear wheels is higher than that of the front wheels. To achieve this irrespective of whether the vehicle is moving forward or rearward, the power transmission system comprises a first pump coupled with the front wheels, a second pump coupled with the rear wheels, communication passages connecting these pumps in series with the inlet of one of them being connected to the outlet of the other, a fluid pressure actuated clutch interposed between the front and rear wheels, and a switching valve for appropriately actuating the clutch according to the difference in the outputs and/or inputs of these pumps.

19 Claims, 4 Drawing Sheets

POWER TRANSMISSION SYSTEM FOR A FOUR-WHEEL DRIVE VEHICLE

TECHNICAL FIELD

The present invention relates to a power transmission system for a four-wheel drive vehicle in which the front wheels are driven by the engine at all time, and the rear wheels may be driven by the common engine as required.

BACKGROUND OF THE INVENTION

As a type of power transmission system to be interposed between the front wheels and the rear wheels of a four-wheel drive vehicle, it is known to directly connect one of the front and rear wheel sets with the engine, provide an oil pressure actuated clutch between one of the front and rear axles, and apply an outlet pressure of an oil pump which is actuated according to the relative rotation between the front and rear wheel sets to the clutch so that a driving coupling may be achieved between the front and rear wheel sets (refer to Japanese patent laid-open publication No. 60-252026). According to this structure, since the force of engagement of the clutch changes substantially in proportion to the square of the relative rotational speed between the front and rear wheel sets, a sufficient capability to restrict a difference between the rotational speeds of the front and rear wheels is obtained when the difference in their rotational speeds is high or when one of the wheel sets is slipping, and the undesirable braking action which tends to occur when a vehicle equipped with a viscous hydraulic coupling is making a turn at low speed can be avoided because the tendency to restrict the difference in the rotational speeds of the front and rear wheels becomes small when the difference in the rotational speeds of the front and rear wheels is small or when the vehicle is cruising involving small or no acceleration or deceleration.

Meanwhile, in a four-wheel drive vehicle in which the front wheels and the rear wheels are coupled with each other via a power transmission system, since the braking force for the front wheels is transmitted to the rear wheels via the power transmission system, the distribution of the braking force between the front and rear wheels tends to vary, and it is desired to control such a variation in the distribution of the braking force in a four-wheel drive vehicle.

However, according to the prior art disclosed in the above mentioned patent publication, since the clutch is engaged by the output pressure of an oil pump actuated by the difference in the rotational speeds of the front and rear wheels, the engagement between the front and rear wheels could occur not only when the front wheels are slipping because of high acceleration but also when the front wheels are inclined to be locked up due to an excessive braking action with the result that the braking force for the front wheels is transmitted to the rear wheels, and a variation arises in the distribution of the braking force between the front wheels and the rear wheels.

BRIEF SUMMARY OF THE INVENTION

In view of such problems of the prior art, a primary object of the preset invention is to provide a power transmission system for a four-wheel drive vehicle which is improved so as to control the restriction on the relative difference between the rotational speeds of the front and rear wheels when the rotational speed of the rear wheels is substantially higher due to a braking action.

A second object of the present invention is to provide a power transmission system for a four-wheel drive vehicle which is improved so as to achieve the above-mentioned primary object irrespective of the direction of the movement of the vehicle by using a simple and compact structure.

A third object of the present invention is to provide a power transmission system for a four-wheel drive vehicle which can automatically couple and decouple the front and rear wheels as required irrespective of the direction of the movement of the vehicle by using an economical and simple pump such as gear pump or vane pump whose outlet and inlet ports are reversed as the rotational direction of the pump is reversed.

These and other objects of the present invention can be accomplished by providing a power transmission system for a four-wheel drive vehicle equipped with front wheels that are directly driven by an engine and rear wheels that are driven by the engine via a fluid pressure actuated clutch, comprising: a first fluid pressure pump which is actuated in synchronism with the front wheels; a second fluid pressure pump which is actuated in synchronism with the rear wheels; a communication passage communicating an outlet port of the first fluid pressure pump with an inlet port of the second fluid pressure pump; and a fluid pressure supply passage communicating the communication passage with an actuation fluid pressure chamber of the fluid pressure actuated clutch.

According to this structure, when the rotational speed of the front wheels is higher than that of the rear wheels, and the output of the first fluid pressure pump is therefore larger than the input of the second fluid pressure pump, a fluid pressure acts upon the clutch. On the other hand, when the rotational speed of the rear wheels is higher than that of the front wheels, and the input of the second fluid pressure pump is therefore larger than the output of the first fluid pressure pump, a fluid pressure does not reach the actuation fluid pressure chamber of the clutch. Therefore, the rear wheels are powered when required, but, when the front wheels are locked up, for instance, due to excessive braking action, since the clutch is disengaged, unfavorable transmission of the braking force from the front wheels to the rear wheels would not occur.

The inlet port of the first fluid pressure pump and the outlet port of the second fluid pressure pump may be connected to a fluid source and a fluid sink, respectively, which may consist of a fluid reservoir, but, according to a particularly preferred form of the present invention, the power transmission system comprises, in addition to the first communication passage, a second communication passage communicating an outlet port of the second fluid pressure pump with an inlet port of the first fluid pressure pump.

It is preferred to provide a by-pass passage connected between the first communication passage and the second communication passage and provided it with a one-way valve allowing fluid flow from the second communication passage to the first communication passage. Thus, when the rotational speed of the rear wheels is higher than that of the front wheels, typically because of a braking action applied to the vehicle, since the output of the second fluid pressure pump is by-passed to its input, the front and rear wheels are reliably disconnected from each other involving very little power loss.

In order to control the maximum force of engagement of the clutch and to thereby avoid the disadvantages arising from rigid coupling between the front and rear wheels, a relief valve may be connected between the first communication passage and the second communication passage to restrict the level of fluid pressure in the actuation fluid pressure chamber of the fluid pressure actuated clutch within a prescribed level.

According to a preferred embodiment of the present invention in which the front and rear wheels are coupled and disengaged as required irrespective of whether the vehicle is moving forward or rearward, there is provided a power transmission system for a four-wheel drive vehicle equipped with front wheels that are directly driven by an engine and rear wheels that are driven by the engine via a fluid pressure actuated clutch, comprising: a first fluid pressure pump which is actuated in synchronism with the front wheels, and provided with a first port serving as an outlet port in forward movement of the vehicle and as an inlet port in rearward movement of the vehicle, and a second port serving as an inlet port in forward movement of the vehicle and as an outlet port in rearward movement; a second fluid pressure pump which is actuated in synchronism with the rear wheels, and provided with a third port serving as an inlet port in forward movement of the vehicle and as an outlet port in rearward movement of the vehicle, and a fourth port serving as an outlet port in forward movement of the vehicle and as an inlet port in rearward movement of the vehicle; a first communication fluid passage communicating the first port with the third port; a second communication fluid passage communicating the second port with the fourth port; and switching means for selectively communicating one of the first and second communication fluid passages with an actuation fluid pressure chamber of the fluid pressure actuated clutch.

By allowing selective communication of the actuation fluid pressure chamber of the clutch with one of the communication fluid passages connected between the first and second fluid pressure pumps, it becomes possible to actuate the clutch appropriately irrespective of the direction of the movement of the vehicle. This switching means may consist of a spool valve which is switched over by a shift position sensor. Alternatively, the switching means may comprise a spool valve having a spool which is actuated between a first position for communicating the first communication fluid passage with the actuation fluid pressure chamber of the fluid pressure actuated clutch and a second position for communicating the second communication fluid passage with the actuation fluid pressure chamber.

The spool may be actuated by the balance between a spring force which urges the spool toward the first position, and fluid pressure applied to the spool by the output from the second port of the first fluid pressure pump. In this case, when the vehicle is moving rearward and the front wheels have been completely locked up as a result of a severe braking action, there is no output from the first fluid pressure pump, and, therefore, the spool will return to the first position with the result that the tendency of the front wheels to be locked up is mitigated by the rotational power transmitted from the rear wheels to the front wheels.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
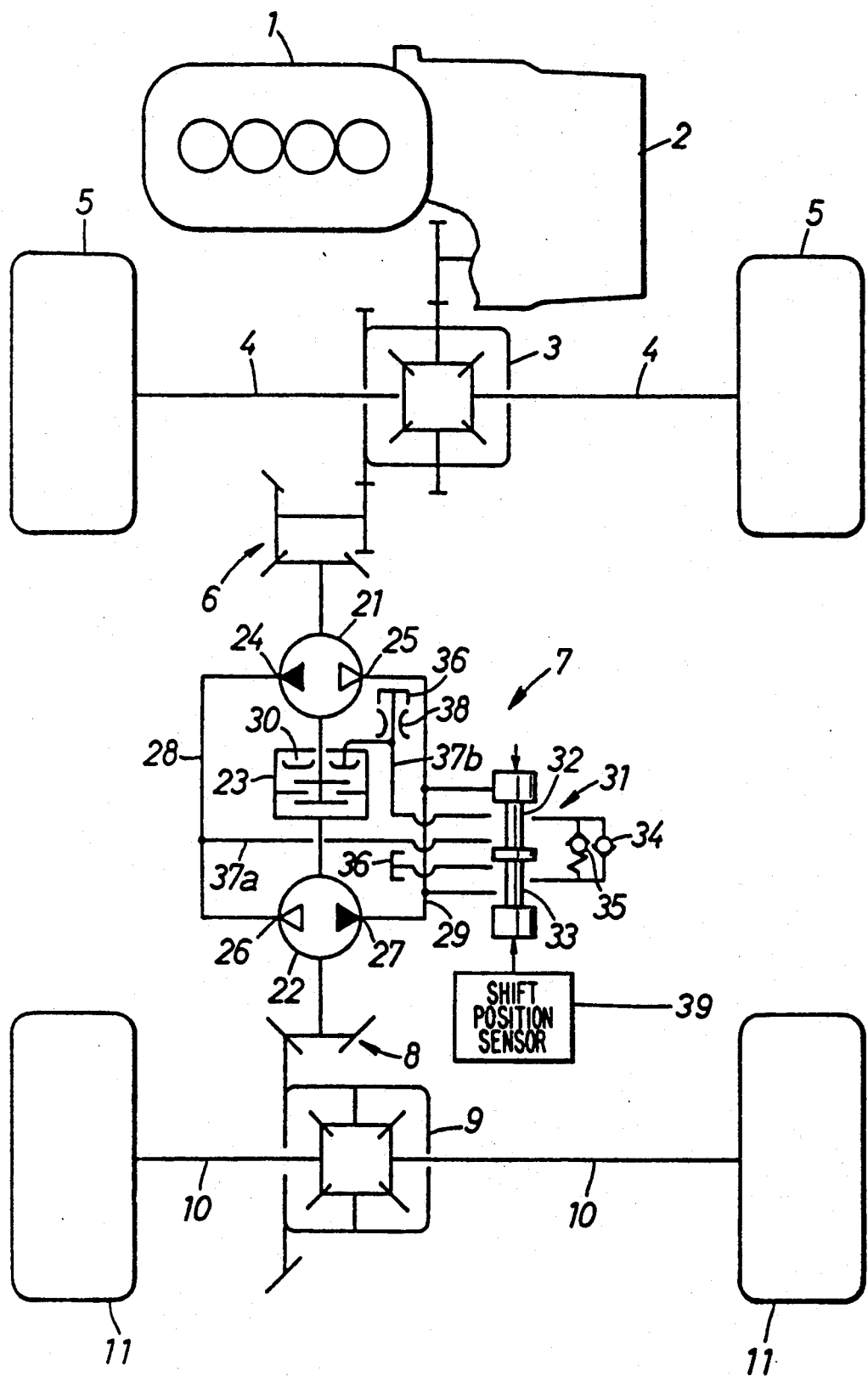
FIG. 1 is a skeleton diagram showing the overall structure of the power transmission system of the four-wheel drive vehicle according to the present invention.

FIG. 1 is a skeleton diagram of the power transmission system of a four-wheel drive vehicle to which the present invention is applied. The output of the engine 1 is supplied to a differential device 3 for the front wheels via a transmission device 2. The output of the differential device 3 is supplied to the right and left front wheels 5 via drive shafts 4.

The output of the engine 1 supplied to the differential device 3 is supplied to a power transmission device 7 which is described hereinafter via a bevel gear device 6, and the output of this power transmission device 7 is transmitted to a differential device 9 for the rear wheels via a bevel gear device 8. The output of the differential device 9 is supplied to the right and left rear wheels 11 via drive shafts 10.

The power transmission device 7 comprises a first fluid pressure pump 21 drivingly connected to the output shaft of the bevel gear device 6 for the front wheels, a second fluid pressure pump 22 drivingly connected to the input shaft of the bevel gear device 8 for the rear wheels, a fluid pressure actuated clutch 23 interposed between the output shaft of the bevel gear device 6 and the input shaft of the bevel gear device 8, and a fluid pressure control circuit (which is described hereinafter) for controlling the flow of oil related to the first and second oil pressure pumps 21 and 22 and the clutch 23.

The first fluid pressure pump 21 consists of a gear pump or a vane pump which is provided with a first port 24 serving as an outlet port when the vehicle is moving forward and as an inlet port when the vehicle is moving rearward, and a second port 25 serving as an inlet port when the vehicle is moving forward and as an outlet port when the vehicle is moving rearward. The second fluid pressure pump 22 likewise consists of a gear pump or a vane pump which is provided with a third port 26 serving as an inlet port when the vehicle is moving forward and as an outlet port when the vehicle is moving rearward, and a fourth port 27 serving as an outlet port when the vehicle is moving forward and as an inlet port when the vehicle is moving rearward. These ports 24 through 27 are mutually connected in such a manner that the first port 24 and the third port 26 are connected to each other via a first communication oil passage 28 while the second port 25 and the fourth port 27 are connected to each other via a second communication oil passage 29.

Figure 2:
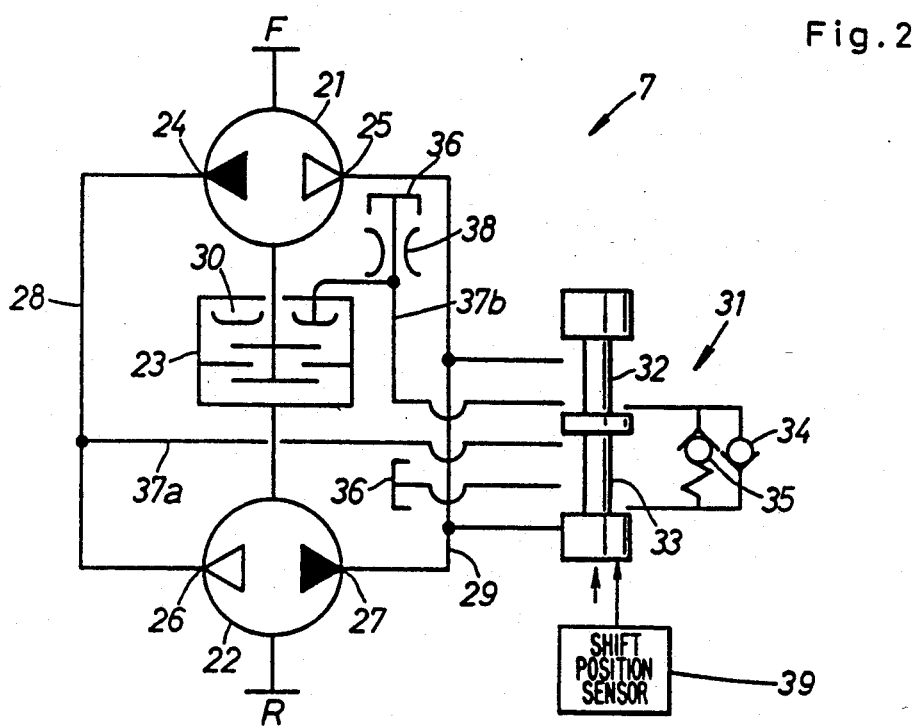
FIG. 2 is a hydraulic circuit diagram in the reverse condition.

The first and second communication oil passages 28 and 29 are connected to an actuation oil pressure chamber 30 of the fluid pressure actuation clutch 23 via a switch switching valve 31, so as to form a fluid pressure supply passage between the first communication oil passage 28 and the actuation oil chamber 30, or the second communication oil passage 29 and the actuation oil chamber 30. This switching valve 31 consists of a spool valve which is switched over by a shift position sensor 39 depending on whether the transmission device 2 is in a forward range or a reverse range, and comprises a pair of valve chambers 32 and 33, a one-way valve 34 restricting the flow of oil from the first valve chamber 32 to the second valve chamber 33, and a relief valve 35 which communicates the first valve chamber 32 with the second valve chamber 33 to allow the flow of oil from the first valve chamber 32 to the second valve chamber 33 when the difference in pressure between the first valve chamber 32 and the second valve chamber 33 has reached a prescribed value. In the forward range, by activation of this switching valve 31, as shown in FIG. 1, the second communication oil passage 29 is communicated with the oil tank 36 via the second valve chamber 33, and the first communication oil passage 28 is communicated with the actuation oil pressure chamber 30 of the clutch via a by-pass oil passage 37a, the first valve chamber 32 and an actuation oil pressure supply passage 37b, thus a fluid pressure supply passage is formed communicating the first communication oil passage 28 with the actuation fluid pressure chamber 30 of clutch 23. Further, when the pressure of the actuation oil pressure chamber 30 of the clutch 23 has increased beyond a certain level, it is released to the oil tank 36 via the relief valve 35. In the reverse range, as shown in FIG. 2, the first communication oil passage 28 is communicated with the oil tank 36 via the second valve chamber 33, and the second communication oil passage 29 is communicated with the actuation oil pressure chamber 30 of the clutch 23 via the first valve chamber 32, thus a fluid pressure supply passage is formed communicating the second communication oil passage 29 with the actuation oil pressure chamber 30 of clutch 23. Further, in either case, when the pressure acting upon the actuation oil pressure chamber 30 of the clutch 23 is increased beyond a certain level, it is released to the oil tank 36 via the relief valve 35.

Further, a clutch actuation oil pressure supply passage 37b connecting the first valve chamber 32 with the actuation oil pressure chamber 30 of the clutch is communicated with a part of the oil tank 36 above its oil level, via a branch oil passage having an orifice 38.

Now the mode of operation of the above-described embodiment is described in the following for each of its different states.

When the vehicle accelerates upon start-off in the forward direction, the front wheels 5 may slip and rotate while the rear wheels 11 remain stationary. In such a case, since the first fluid pressure pump 21 alone rotates with the front wheels, the oil which has been supplied from the oil tank 36 to the second port 25 via the second valve chamber 33 and the second communication oil passage 29 is expelled from the first port 24 to the first communication oil passage 28, and all of it flows into the by-pass oil passage 37a so that an oil pressure may be applied to the clutch actuation oil pressure chamber 30 via the first valve chamber 32 and the clutch actuation oil pressure supply passage 37b. As a result, the clutch 23 is engaged, and the front wheels 5 are coupled with the rear wheels 11.

The oil pressure immediately upstream of the orifice 38 changes in proportion to the square of the difference between the output of the first pressure pump 21 and the input of the second fluid pressure pump 22. Further, depending on the rate of the oil passing through the orifice 38, it is possible to set the basic oil pressure property of the upstream end of the orifice. Since the transmission torque of the clutch 23 changes in proportion to the oil pressure acting upon the actuation oil pressure chamber 30, by appropriately selecting the relief pressure of the relief valve 35, it is possible to appropriately set the upper limit of the transmission torque of the clutch 23.

When the clutch 23 is engaged and the drive torque is transmitted to the rear wheels, the output of the first fluid pressure pump 21 is received by the second fluid pressure pump 22 according to the increase in the rotational speed of the rear wheels. Further, the oil pressure acting upon the clutch actuation oil pressure chamber 30, or the force of engagement of the clutch 23 automatically changes according to the difference between the output of the first fluid pressure pump 21 and the input of the second fluid pressure pump 22, and, once a constant speed cruise condition is reached, and the difference in the rotational speeds of the front and rear wheels is substantially reduced to zero, no oil pressure acts upon the clutch actuation oil pressure chamber 30 so that the transmission of torque to the rear wheels is interrupted.

When the vehicle is gradually accelerating in forward or rearward direction, or cruising at constant speed, the front and rear wheels 5 and 11 rotate substantially at the same speed provided that the front and rear wheels 5 and 11 have an identical diameter. Since the capacities of the first fluid pressure pump 21 driven with the front wheels 5 and the second fluid pressure pump 22 driven with the rear wheels 11 are selected to be the same, when the two oil pressure pumps 21 and 22 rotate at the same speed as the front and rear wheels 5 and 11, the oil circulates between the two oil pressure pumps 21 and 22 via the first communication oil passage 28 and the second communication oil passage 29. In other words, the pressure in the first communication oil passage 28 does not reach the actuation pressure of the clutch 23 and, therefore, the drive torque is not transmitted to the rear wheels 11.

When only the front wheels have stepped into a road surface having a low coefficient of friction during a cruising condition of the vehicle or when the vehicle is suddenly accelerated, the front wheels may temporarily get into a slipping condition. In such a case, the rotational speed of the front wheels becomes higher than that of the rear wheels 11, and the output from the first port 24 exceeds the input of the third port 26. As a result, the output from the first fluid pressure pump 24 cannot be accommodated by the input to the second fluid pressure pump 22, and the oil pressure corresponding to this difference between the output and input of the two fluid pressure pumps 21 and 22, respectively, is applied to the first communication oil passage 28. This oil pressure is conducted into the clutch actuation oil pressure chamber 30 via the by-pass oil passage 37a, the first valve chamber 32 and the actuation oil pressure supply passage 37b. Thereby, the clutch 23 is engaged, and a drive torque is transmitted to the rear wheels 11. The force of engagement of the clutch 23 changes automatically in relation with the difference in the rotational speeds of the front and rear wheels, and the drive torque transmitted to the rear wheels 11 changes in proportion to the magnitude of the force of engagement of the clutch 23.

When a braking force acts upon the wheels, since the braking force is generally distributed more to the front wheels than to the rear wheels, the front wheels 5 tend to be locked up before the rear wheels 11 do. Since the engine brake following a cruise condition acts only upon the front wheels 5, the rotational speed of the front wheels 5 becomes temporarily lower than that of the rear wheels 11. When the rotational speed of the front wheels 5 is lower than that of the rear wheels 11, the output of the first fluid pressure pump 21 becomes less than the input to the second fluid pressure pump 22; thus, there is no output pressure in the actuation oil pressure supply passage 37b, and the clutch 23 would not be engaged. Therefore, the coupling between the front and rear wheels is interrupted. At this point, a part of the output from the fourth port 27 returns to the third port 26 via the second communication oil passage 29, the second valve chamber 33, the one-way valve 34, the first valve chamber 32, the by-pass oil passage 37a and the first communication oil passage 28.

When the front wheels have been completely locked up, the first fluid pressure pump 21 comes to a stop, and the second fluid pressure pump 22 alone rotates. As a result, all of the output of oil from the fourth port 27 to the second communication oil passage 29 returns to the third port 26 via the second valve chamber 33, the one-way valve 34, the first valve chamber 32, the by-pass oil passage 37a and the first communication oil passage 28. Therefore, in this case also, the clutch 23 is not engaged, and the coupling between the front and rear wheels is interrupted.

When the vehicle is moving rearward, the rotational directions of the first and second fluid pressure pumps 21 and 22 are reversed, and the relationship between the outlet ports and the inlet ports is reversed, but the basic principle is otherwise identical to the case when the vehicle is moving forward.

When the vehicle accelerates as it starts off in rearward direction, temporarily, the first fluid pressure pump 21 alone rotates. Then, as illustrated in FIG. 2, the oil, introduced into the first port 24 from the oil tank 36 via the second valve chamber 33, the by-pass oil passage 37a, and the first communication oil passage 28, is expelled from the second port 25 to the second communication oil passage 29, and, then, acts upon the clutch actuation oil pressure chamber 30 via the first valve chamber 32 and the actuation oil pressure supply passage 37b. As a result, the clutch 23 is engaged, and a drive torque is transmitted to the rear wheels 11.

In a similar manner as in the case of the vehicle moving forward, as the rotational speed of the rear wheels increases, a part of the output of the first fluid pressure pump 21 is received by the second fluid pressure pump 22, and the oil pressure acting upon the clutch actuation oil pressure chamber 30 changes according to the difference in the output and input of the two pumps 21 and 22, respectively, so that the ratio of torque distribution to the rear wheels changes accordingly. Once the vehicle moves on to a constant speed cruise condition, no oil pressure acts upon the clutch actuation oil pressure chamber 30, and the coupling between the front and rear wheels is interrupted.

When the vehicle is gradually accelerating either forward or rearward, or cruising at constant speed, the first fluid pressure pump 21 and the second fluid pressure pump 22 both rotate substantially at the same rotational speed. Thus, the output from the second port 25 is received by the fourth port 27 via the second communication oil passage 29, and the output from the third port 26 is received by the first port 24 via the first communication oil passage 28. Therefore, the pressure in the first and second communication oil passages 28 and 29 does not reach the actuation level of the clutch 23, and no drive torque is therefore transmitted to the rear wheels 11.

When the front wheels 5 start slipping due to sudden acceleration from a constant speed rearward movement, the rotational speed of the front wheels 5 becomes higher than that of the rear wheels 11, the output of the first fluid pressure pump 21, therefore, exceeds the input of the second fluid pressure pump 22. Since the second fluid pressure pump 22 cannot accommodate the output from the first fluid pressure pump 21, the oil pressure corresponding to the difference in the output of the first fluid pressure pump 21 and the second fluid pressure pump 22 acts upon the second communication oil passage 29. This oil pressure is conducted to the clutch actuation oil pressure chamber 30 via the first valve chamber 32 and the actuation oil pressure supply passage 37b. This causes the clutch 23 to be engaged, and a drive torque is transmitted to the rear wheels 11.

When the vehicle is moving rearward and a braking action takes place, since the rotational speed of the first fluid pressure pump 21 falls below that of the second fluid pressure pump 22, in the same way as in the case of applying a braking action when the vehicle is moving forward, there is no output to the actuation oil pressure supply passage 37b, and the clutch 23 is not engaged. Therefore, the coupling between the front and rear wheels is interrupted. At this point, a part of the output from the second fluid pressure pump 22 returns to the fourth port 27 via the first communication oil passage 28, the by-pass oil passage 37a, the second valve chamber 33, the one-way valve 34, the first valve chamber 32 and the second communication oil passage 29. Once the front wheels 5 are completely locked up, all of the output from the third port 26 returns to the fourth port 27 via the first communication oil passage 28, the by-pass passage 37a, the second valve chamber 33, the one-way valve 34, the first valve chamber 32 and the second communication oil passage 29. Therefore, in this case also, the coupling between the front and rear wheels is interrupted.

In short, according to the first embodiment of the present invention, irrespective of whether the vehicle is moving forward or rearward, the front wheels and the rear wheels are coupled with each other when the rotational speed of the front wheels is higher than that of the rear wheels due to the slipping of the front wheels or the sudden acceleration of the vehicle, but this coupling is disconnected when the rotational speeds of the front and rear wheels are substantially identical because the vehicle is cruising at constant speed without involving any slipping of the front or rear wheels, or when the rotational speed of the rear wheels is higher than that of the front wheels because of the braking action which tends to lock up the front wheels more than the rear wheels. Thereby, the four-wheel drive vehicle can obtain a necessary traction when required, but is free from the disadvantage of undesirably transmitting the braking force from the front wheels to the rear wheels.

Figure 3:
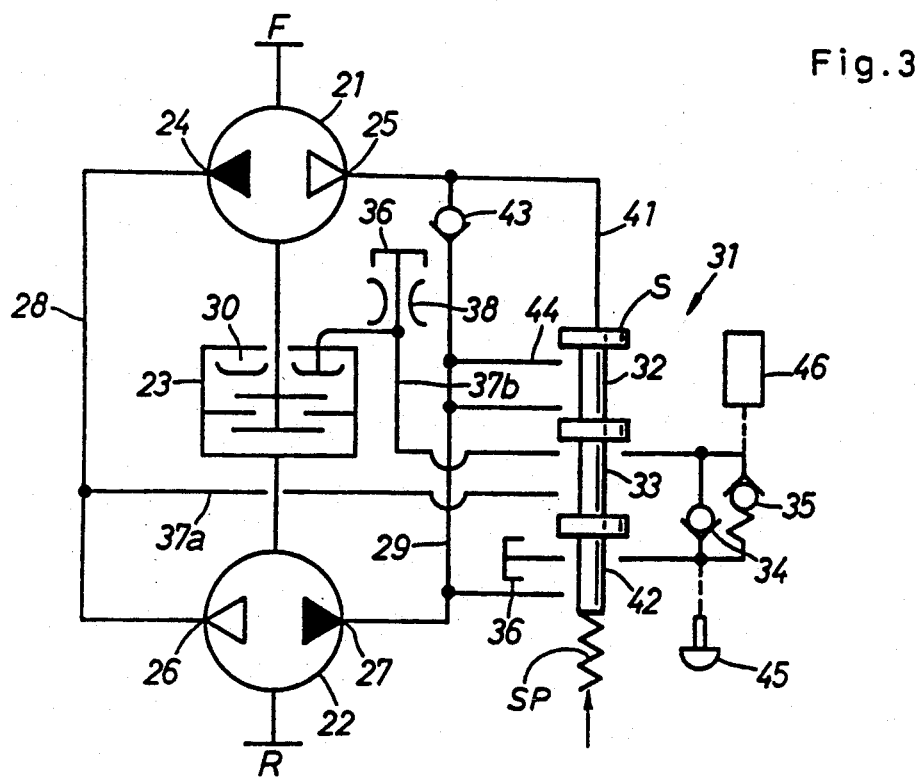
FIG. 3 is a hydraulic circuit diagram of a second embodiment of the present invention in the forward condition.
Figure 4:
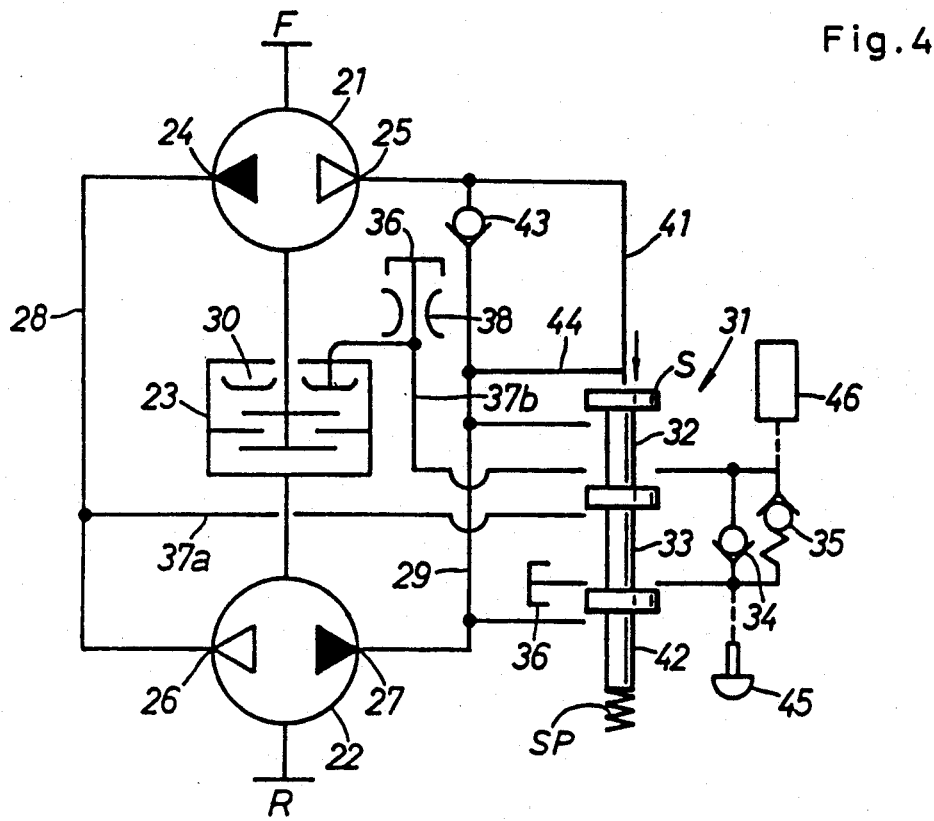
FIG. 4 is the same hydraulic circuit diagram in the reverse condition.

FIGS. 3 and 4 show a second embodiment of the present invention, and the parts common to those of the first embodiments are denoted with like numerals. The following description is directed only to those parts different from those of the first embodiment.

The spool S of the switching valve 31 in this embodiment is always urged toward a first position by a spring SP, and can move to a second position against the biasing spring force of this spring SP by being acted upon by the output pressure from the second port 25 of the first fluid pressure pump 21 transmitted to one end of the spool via a switching oil passage 41 branching off from the second communication oil passage 29. This switching valve 31 comprises three valve chambers 32, 33 and 42, a one-way valve 34 restricting the flow of oil from the second valve chamber 33 to the third valve chamber 42 when the vehicle is moving forward and the flow of oil from the first valve chamber 32 to the second valve chamber 33 when the vehicle is moving rearward (as described hereinafter), and a relief valve 35 which communicates the second valve chamber 33 with the third valve chamber 42 to permit the flow of oil from the second valve chamber 33 to the third valve chamber 42 when the vehicle is moving forward and the difference in pressure between the second valve chamber 33 and the third valve chamber 42 exceeds a certain level and the first valve chamber 32 with the second valve chamber 33 to permit the flow of oil from the first valve chamber 32 to the second valve chamber 33 when the vehicle is moving rearward and the difference in pressure between the first valve chamber 32 and the second valve chamber 33 exceeds the aforementioned level (as described hereinafter). A one-way valve 43 is provided in a branch conduit extending from the switching oil passage 41 to the second communication oil passage 29 to permit the flow of oil only from the fourth port 27 to the second port 25.

When the vehicle is moving forward, since the spool S is located at the first position illustrated in FIG. 3, the second communication oil passage 29 is communicated with the oil tank 36 via the third valve chamber 42, and the first communication oil passage 28 is communicated with the clutch actuation oil pressure chamber 30 via the by-pass oil passage 37a, the second valve chamber 33 and the clutch actuation oil pressure supply passage 37b, thus a fluid pressure supply passage is formed communicating the first communication oil passage 28 with the actuation oil pressure chamber 30 of clutch 23. Further, when the pressure acting upon the clutch actuation oil pressure chamber 30 exceeds a certain level, the pressure is relieved to the oil tank 36 via the relief valve 35.

When the vehicle is moving rearward, since the spool S is located at its second position as illustrated in FIG. 4, the first communication oil passage 28 is communicated with the oil tank 36 via the by-pass oil passage 37a and the second valve chamber 33, and the second communication oil passage 29 is communicated with the clutch actuation oil pressure chamber 30 via the first valve chamber 32 and the clutch actuation oil pressure supply passage 37b, thus a fluid pressure supply passage is formed communicating the second communication oil passage 29 with the actuation oil pressure chamber 30 of clutch 23. Further, the switching oil passage 41 is communicated to an end of the spool S and then with the second communication oil passage 29 via a communication oil passage 44 so as to apply the output pressure of the second port 25 upon the end of the spool S, and the pressure is released to the oil tank 36 via the relief valve 35 when the pressure acting upon the clutch actuation oil pressure chamber 30 exceeds a certain level.

The clutch actuation oil supply passage 37b connected between the switching valve 31 and the clutch actuation oil pressure chamber 30 is communicated with a part of the oil tank 36 above its oil level via a branch passage having an orifice 38.

The one-way valve 34 of this embodiment can be opened up manually by using a manual actuation knob 45 so that the oil pressure in the clutch actuation pressure chamber 30 may be removed so as to manually interrupt the coupling between the front and rear wheels by opening the one-way valve 34 as desired. The relief valve 35 is connected to a heat sensitive element 46 using known thermowax or the like so that the pressure of the clutch actuation oil pressure chamber 30 of the clutch 23 may be released to the oil tank 36 when the oil temperature reaches a prescribed level (for instance 120° C.). Thereby, the maximum torque transmission level is determined, and the excessive rise in the oil temperature can be avoided. This is advantageous when the diameter of one of the wheels is different from that of the other wheels as is the case when a smaller emergency spare tire is used.

Now the mode of operation of this embodiment is described in the following for each of its conditions in the same way as in the first embodiment.

When the front wheels 5 are temporarily brought into a slipping condition by being directly driven by the engine 1 in suddenly accelerating the vehicle from standstill, since only the first fluid pressure pump 21 which is driven with the front wheels 5 rotates, the oil in the oil tank 36 is introduced into the second port 25 via the third valve chamber 42 and the one-way valve 43 of the second communication oil passage 29, and is expelled from the first port 24. The pressure of the oil expelled into the first communication oil passage 28 acts upon the clutch actuation oil pressure chamber 30 of the clutch 23 via the by-pass oil passage 37a, the second valve chamber 33 and the actuation oil pressure supply passage 37b. This causes the clutch 23 to be engaged, and the front and rear wheels 5 and 11 are coupled with each other.

When the clutch 23 is engaged, and the second fluid pressure pump 22 rotates with the rear wheels 11, the output of the first fluid pressure pump 21 is received by the second fluid pressure pump 22. As a result, the force of engagement of the clutch 23 is automatically varied according to the difference between the output of the first fluid pressure pump 21 and the input of the second fluid pressure pump 22, and, once the vehicle starts to run at constant speed and the two fluid pressure pumps 21 and 22 begin to rotate at the same rotational speed as the front and rear wheels 5 and 11, the oil circulates between the two fluid pressure pumps 21 and 22 via the first and second communication oil passages 28 and 29. Therefore, no oil pressure acts upon the clutch actuation oil pressure chamber 30, and the transmission of a drive torque to the rear wheels 11 is interrupted.

When only the front wheels 5 start slipping from a cruising condition of the vehicle, the rotational speed of the front wheels 5 exceeds that of the rear wheels 11, and the output from the first port 24 exceeds the input to the third port 26. Then, the oil pressure corresponding to the difference between the output of the first fluid pressure pump 21 and the second fluid pressure pump 22 is introduced into the clutch actuation oil pressure chamber 30 via the first communication oil passage 28, the by-pass oil passage 37a, the second valve chamber 33 and the actuation oil pressure supply passage 37b, and the clutch 23 is engaged so as to transmit the drive torque to the rear wheels 11.

When a braking force acts upon the wheels, and the rotational speed of the front wheels 5 becomes lower than that of the rear wheels 11 so that the output of the first fluid pressure pump 21 becomes less than the input to the second fluid pressure pump 22, there is no output pressure in the actuation oil pressure supply passage 37b, and the clutch 23 would not be engaged. Therefore, the coupling between the front and rear wheels is interrupted. At this point, a part of the output from the fourth port 27 returns to the third port 26 via the second communication oil passage 29, the third valve chamber 42, the one-way valve 34, the second valve chamber 33, the by-pass oil passage 37a and the first communication oil passage 28.

When the front wheels 5 have been completely locked up, all of the output of oil from the fourth port 27 to the second communication oil passage 29 returns to the third port 26 via the third valve chamber 42, the one-way valve 34, and the second valve chamber 33, the by-pass oil passage 37a and the first communication oil passage 28. Therefore, in this case also, the clutch 23 is not engaged, and the coupling between the front and rear wheels is interrupted.

When the vehicle is moving rearward, the rotational directions of the first and second fluid pressure pumps 21 and 22 are reversed, and the relationship between the outlet ports and the inlet ports is reversed. Therefore, the output from the second port 25 flows into the switching oil passage 41 by virtue of the one-way valve 43, and acts upon an end of the spool S. As a result, the spool S moves on to the position indicated in FIG. 4, and the output from the second port 25 flows into the second communication oil passage 29 via the communication oil passage 44.

When the vehicle accelerates as it starts off in rearward direction, since the second fluid pressure pump 22 is stationary, the oil is supplied from the oil tank 36 to the first fluid pressure pump 21 by way of the second valve chamber 33, the by-pass oil passage 37a, and the first communication oil passage 28, and is forwarded from the second port 25 to the second communication oil passage 29 via the switching oil passage 41 and the communication oil passage 44. The pressure of the oil then acts upon the clutch actuation oil pressure chamber 30 via the first valve chamber 32 and the actuation oil pressure supply passage 37b. As a result, the clutch 23 is engaged, and the front and rear wheels 5 and 11 are coupled with each other.

As the rotational speed of the rear wheels increases, a part of the output from the first fluid pressure pump 21 is received by the second fluid pressure pump 22, and, in the same manner as in the first embodiment, the force of engagement of the clutch 23 changes according to the output of the first fluid pressure pump 21 and the input of the second fluid pressure pump 22. Once the vehicle moves on to a constant speed cruise condition, no oil pressure is applied to the actuation oil pressure chamber 30, and the coupling between the front and rear wheels is disconnected.

When the first and second fluid pressure pumps 21 and 22 rotate at the same speed, the oil circulates between the two fluid pressure pumps 21 and 22 via the first and second communication oil passages 28 and 29 including the switching oil passage 41 and the communication oil passage 44. The biasing spring force of the spool S is determined in such a manner that the spool S may be kept displaced by the output pressure from the second port 25 at this point.

When the vehicle is moving rearward, and a braking action is applied to the extent not quite enough to lock up the front wheels, since the rotational speed of the second fluid pressure pump 22 rotating with the rear wheels 11 exceeds that of the first fluid pressure pump 21, there is no output pressure to the actuation oil pressure supply passage 37b, and the clutch 23 is not engaged. Therefore, the coupling between the front and rear wheels is interrupted. At this point, a part of the output from the third port 26 returns to the fourth port 27 via the first communication oil passage 28, the by-pass oil passage 37a, the second valve chamber 33, the one-way valve 34 and the second communication oil passage 29.

When the front wheels 5 have been completely locked up, since the first fluid pressure pump 21 comes to a stop, there is no pressure output from the switching oil passage 41, and the spool S returns to the position indicated in FIG. 3. As a result, the output from the third port 26 flows into the clutch actuating oil pressure chamber 30 via the by-pass oil passage 37a, the second valve chamber 33, and the actuation oil pressure supply passage 37b, thereby engaging the clutch 23. Thus, the rotational speed of the rear wheels 11 is transmitted to the front wheels 5, and the completely locked-up state of the front wheels 5 may be controlled by the rotational force transmitted to the front wheels 5 from the rear wheels 11.

In this way, according to this embodiment, the switching valve 31 is actuated by the output pressure from the first fluid pressure pump 21 which is in turn actuated by the front wheels as the vehicle is moving rearward. Therefore, the need for an external actuator for actuating the switch valve, and a running condition sensor or a shift position sensor for supplying a command signal to the actuator is eliminated, and the clutch control for dealing with the slipping of the front wheels when the vehicle is accelerating and the locking of the front wheels when a braking action has been taken can be completely automatically carried out according to the direction of the movement of the vehicle either forward or rearward.

When the vehicle is moving rearward and a braking action is taken, the ground contact force of the front wheels is reduced due to the shift of the center of gravity, and the front wheels becomes more prone to locking. In this case also, since the switching valve 31 is switched over immediately after the front wheels 5 have been locked up, and the output of the second fluid pressure pump 22 acts upon the clutch actuation fluid chamber 30 so as to engage the clutch 23, the rotational force of the rear wheels 11 is transmitted to the front wheels 5, and the complete lock up of the front wheels 5 can be controlled.

According to the second embodiment of the present invention, the aforementioned advantage of the first embodiment can be obtained without requiring any external means to switch over the switching valve. Further, since the switching valve is switched over by the absence of the output pressure from the oil pump powered by the front wheels when the vehicle is moving rearward and the front wheels are locked up, the rotational force of the rear wheels is transmitted to the front wheels, and the tendency of the front wheels to lock up is thereby mitigated.

Figure 6:
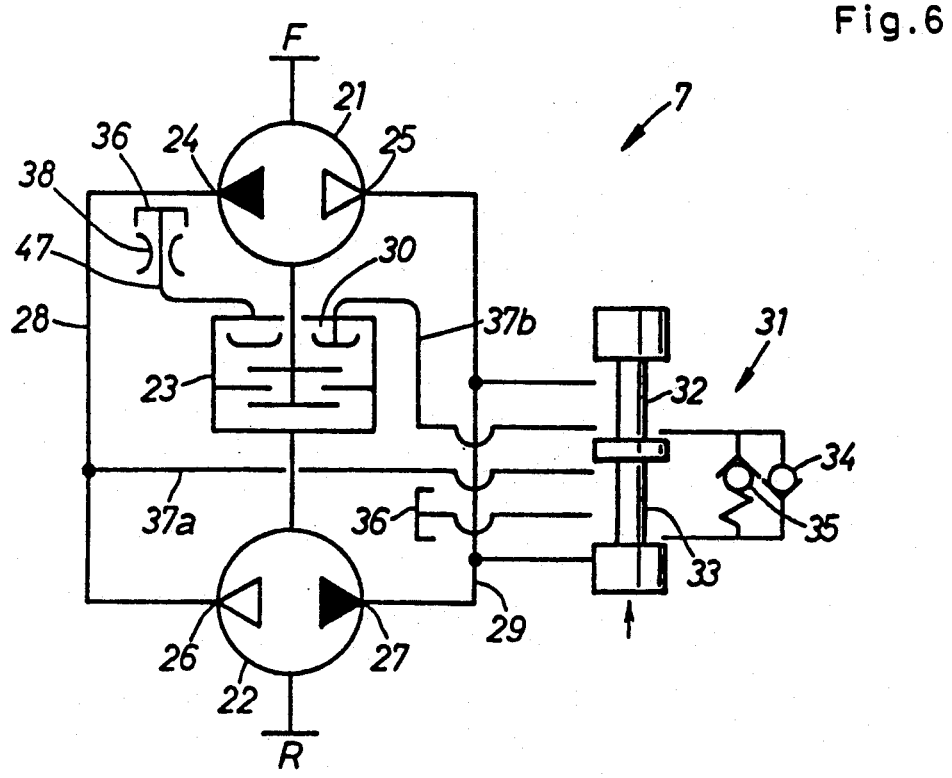
FIGS. 5 and 6 are views similar to FIGS. 1 and 2, respectively, showing a third embodiment of the present invention.
Figure 5:
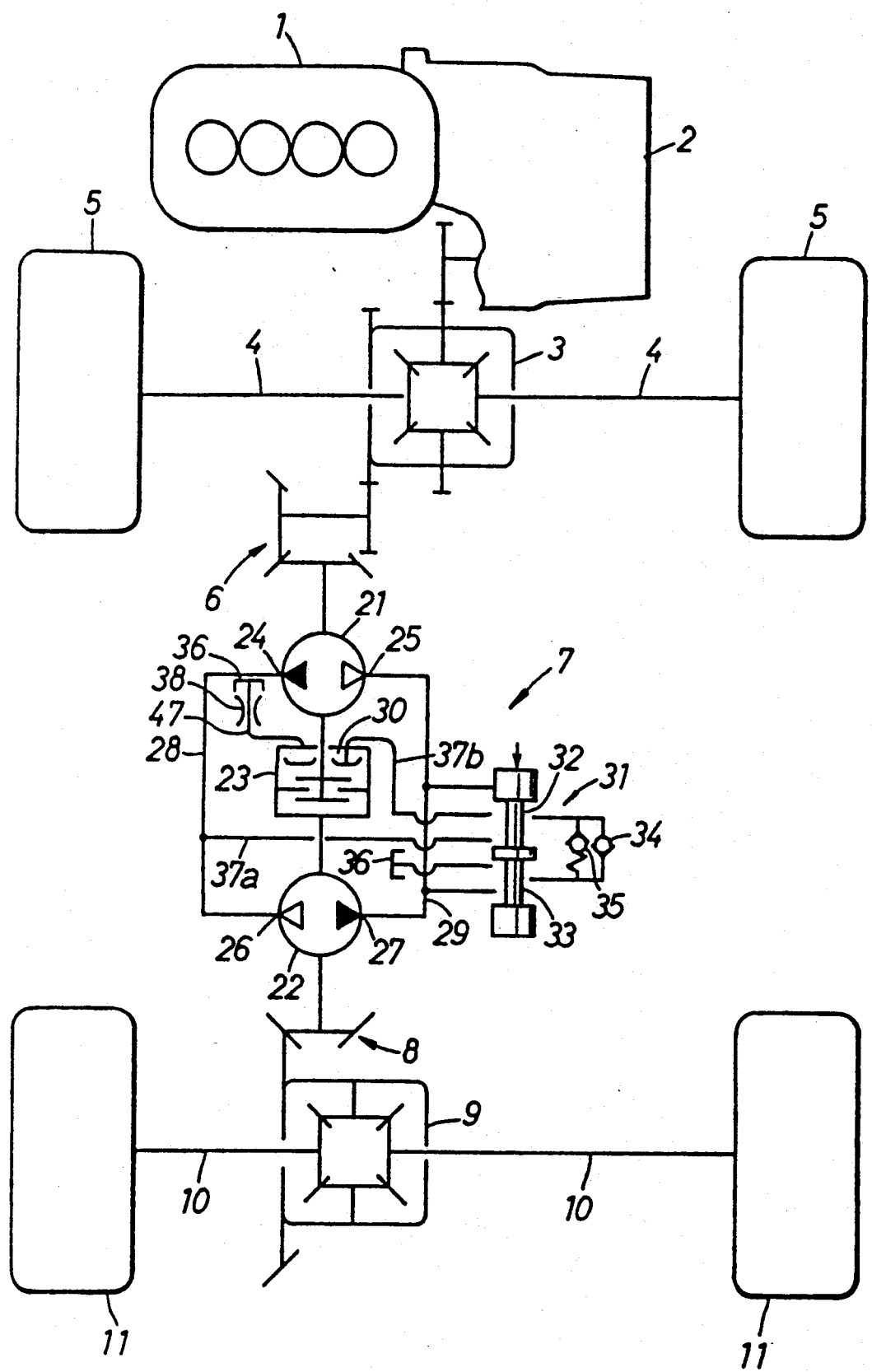

FIGS. 5 and 6 show a third embodiment of the present invention, and the parts of this embodiment common to those of the first embodiment are denoted with like numerals. The following description is limited to those parts different from those of the first embodiment.

The actuation oil pressure chamber 30 was communicated with the oil tank 36 via a passage having an orifice 38 branched off from the clutch actuation oil pressure supply passage 37b in the first and second embodiments, but a separate communication passage 47 equipped with an orifice 38 is provided between the actuation oil pressure chamber 30 and the oil tank 36. Thereby, in supplying pressurized oil from the clutch actuation oil supply passage 37b to the actuation oil pressure chamber, the air trapped into the oil can be readily expelled from the actuation oil pressure chamber 30 so that the responsiveness of the clutch 23 can be improved even further.

This embodiment is similar to the first and second embodiments in that the clutch actuation oil pressure property is determined by the relief flow rate of the orifice, and in how the clutch 23 operates. Obviously, the communication oil passage 47 can be equally applied to the first and second embodiments.

Thus, according to the present invention, it is possible to automatically vary the force of engagement of the clutch according to the difference in the rotational speeds of the front and rear wheels. In particular, the force of engagement of the clutch is increased when the rotational speed of the front wheels is higher than that of the rear wheels, while the supply of fluid pressure to the clutch is interrupted when the rotational speed of the rear wheels is higher than that of the front wheels. Therefore, when the front wheels are slipping due to sudden acceleration of the vehicle, a drive force is supplied to the rear wheels also, and the coupling between the front and rear wheels is disconnected in a braking situation, a significant advantage can be obtained in improving the running performance of the four-wheel drive vehicle. Furthermore, by providing switching means for selectively switching over the communication to the clutch actuation oil pressure chamber, it becomes possible to favorably control the clutch irrespective of the direction of the vehicle movement, and, therefore, a significant advantage can be obtained in reducing the size and weight of the oil pump.

Although the present invention has been described in terms of specific embodiments, it is possible to modify and alter details thereof without departing from the spirit of the present invention.

What we claim is:

1. A power transmission system for a four-wheel drive vehicle equipped with front wheels that are directly driven by an engine and rear wheels that are driven by said engine via a fluid pressure actuated clutch, comprising:
   a first fluid pressure pump which is actuated in synchronism with said front wheels;
   a second fluid pressure pump which is actuated in synchronism with said rear wheels;
   a communication passage communicating an outlet port of said first fluid pressure pump with an inlet port of said second fluid pressure pump;
   a fluid pressure supply passage communicating said communication passage with an actuation fluid pressure chamber of said fluid pressure actuated clutch.

2. A power transmission system for a four-wheel drive vehicle equipped with front wheels that are directly driven by an engine and rear wheels that are driven by said engine via a fluid pressure actuated clutch, comprising:
   a first fluid pressure pump which is actuated in synchronism with said front wheels;
   a second fluid pressure pump which is actuated in synchronism with said rear wheels;
   a first communication passage communicating an outlet port of said first fluid pressure pump with an inlet port of said second fluid pressure pump;
   a second communication passage communicating an outlet port of said second fluid pressure pump with an inlet port of said first fluid pressure pump; and
   a fluid pressure supply passage communicating said first communication passage with an actuation fluid pressure chamber of said fluid pressure actuated clutch.

3. A power transmission system according to claim 2, further comprising a by-pass passage connected between said first communication passage and said second communication passage and provided with a one-way valve allowing fluid flow from said second communication passage to said first communication passage.

4. A power transmission system according to claim 2, further comprising a relief valve connected between said first communication passage and said second communication passage to restrict the level of fluid pressure in said actuation fluid pressure chamber of said fluid pressure actuated clutch within a prescribed level.

5. A power transmission system for a four-wheel drive vehicle equipped with front wheels that are directly driven by an engine and rear wheels that are driven by the engine via a fluid pressure actuated clutch, comprising:
   a first fluid pressure pump which is actuated in synchronism with said front wheels, and provided with a first port serving as an outlet port in forward movement of the vehicle and as an inlet port in rearward movement of the vehicle, and a second port serving as an inlet port in forward movement of the vehicle and as an outlet port in rearward movement of the vehicle;
   a second fluid pressure pump which is actuated in synchronism with the rear wheels, and provided with a third port serving as an inlet port in forward movement of the vehicle and as an outlet port in rearward movement of the vehicle, and a fourth port serving as an outlet port in forward movement of the vehicle and as an inlet port in rearward movement of the vehicle;
   a first communication fluid passage communicating said first port with said third port;
   a second communication fluid passage communicating said second port with said fourth port; and
   switching means for selectively communicating one of said first and second communication fluid passages with an actuation fluid pressure chamber of said fluid pressure actuated clutch.

6. A power transmission system according to claim 5, wherein said switching means comprises a spool valve having a spool which is actuated depending on whether the vehicle is moving forward or rearward between a first position for communicating said first communication fluid passage with said actuation fluid pressure chamber of said fluid pressure actuated clutch and a second position for communicating said second communication fluid passage with said actuation fluid pressure chamber.

7. A power transmission system according to claim 6, wherein said spool valve is switched over by a shift position sensor.

8. A power transmission system according to claim 6, wherein said spool is urged toward said first position by spring means, and said spool is moved to said second position against the spring force of said spring means by application of fluid pressure from said second port of said first fluid pressure pump.

9. A power transmission system according to claim 8, further comprising a by-pass passage including a one-way valve connected between said first and second communication fluid passages, said spool valve switching over said one-way valve in such a manner that said one-way valve allows flow of fluid from said second communication fluid passage to said first communication fluid passage when the vehicle is moving forward and flow of fluid from said first communication fluid passage to said second communication fluid passage when the vehicle is moving rearward.

10. A power transmission system according to claim 9, further comprising a relief valve connected between said first communication passage and said second communication passage to restrict the level of fluid pressure in said actuation fluid pressure chamber of said fluid pressure actuated clutch within a prescribed level.

11. A power transmission system according to claim 10 wherein said one way valve can be opened manually.

12. A power transmission system according to claim 10 wherein a heat sensitive element is coupled to the relief valve to restrict the temperature in said actuation fluid pressure chamber of said pressure actuation clutch to a prescribed level.

13. A power transmission system according to claim 8 wherein said fluid actuation chamber is provided with a separate communication passage between the actuation oil pressure chamber and an oil tank, said separate communication passage being equipped with an orifice.

14. A power transmission system according to claim 6, further comprising a by-pass passage including a one-way valve connected between said first and second communication fluid passages, said spool valve switching over said one-way valve in such a manner that said one-way valve allows flow of fluid from said second communication fluid passage to said first communication fluid passage when the vehicle is moving forward and flow of fluid from said first communication fluid passage to said second communication fluid passage when the vehicle is moving rearward.

15. A power transmission system according to claim 14, further comprising a relieve valve connected between said first communication passage and said second communication passage to restrict the level of fluid pressure in said actuation fluid pressure chamber of said fluid pressure actuated clutch within a prescribed level.

16. A power transmission system according to claim 6, further comprising a relief valve connected between said first communication passage and said second communication passage to restrict the level of fluid pressure in said actuation fluid pressure chamber of said fluid pressure actuated clutch within a prescribed level.

17. A power transmission system according to claim 5, further comprising a by-pass passage including a one-way valve connected between said first and second communication fluid passages, said switching means switching over said one-way valve in such a manner that said one-way valve allows flow of fluid from said second communication fluid passage to said first communication fluid passage when the vehicle is moving forward and flow of fluid from said first communication fluid passage to said second communication fluid passage when the vehicle is moving rearward.

18. A power transmission system according to claim 5, further comprising a relief valve connected between said first communication passage and said second communication passage to restrict the level of fluid pressure in said actuation fluid pressure chamber of said fluid pressure actuated clutch within a prescribed level.

19. A power transmission system according to claim 5 wherein said fluid actuation chamber is provided with a separate communication passage between the actuation oil pressure chamber and an oil tank, said separate communication passage being equipped with an orifice.

* * * * *